(12) United States Patent
Wang et al.

(10) Patent No.: US 8,996,380 B2
(45) Date of Patent: *Mar. 31, 2015

(54) METHODS AND SYSTEMS FOR SYNCHRONIZING MEDIA

(75) Inventors: Avery Li-Chun Wang, Palo Alto, CA (US); Rahul Powar, London (GB); William Michael Mills, Twickenham (GB); Christopher Jacques Penrose Barton, San Francisco (CA); Philip Georges Inghelbrecht, San Francisco, CA (US); Dheeraj Shankar Mukherjee, London (GB)

(73) Assignee: Shazam Entertainment Ltd., London (GB)

( * ) Notice: Subject to any disclaimer, the term of this patent is extended or adjusted under 35 U.S.C. 154(b) by 954 days.

This patent is subject to a terminal disclaimer.

(21) Appl. No.: 13/100,825

(22) Filed: May 4, 2011

(65) Prior Publication Data
US 2011/0276334 A1    Nov. 10, 2011

Related U.S. Application Data

(60) Provisional application No. 61/331,015, filed on May 4, 2010.

(51) Int. Cl.
*G10L 11/00*   (2006.01)
*G10L 25/48*   (2013.01)
*G06F 17/30*   (2006.01)

(52) U.S. Cl.
CPC .......... *G10L 25/48* (2013.01); *G06F 17/30861* (2013.01)
USPC ........ 704/270; 348/460; 379/88.22; 386/282; 455/66.1; 700/94; 704/211; 704/214; 704/231; 704/233; 704/235; 704/241; 704/243; 704/244; 704/251; 704/254; 704/278; 705/500; 705/51; 705/52; 705/54; 709/223; 709/231; 709/238; 711/100; 715/245; 715/724; 715/727; 715/716

(58) Field of Classification Search
CPC ....... G10L 15/22; G10L 15/265; G10L 17/26; G10L 13/043; G06F 3/16
USPC ......................................................... 704/270
See application file for complete search history.

(56) References Cited

U.S. PATENT DOCUMENTS 4,230,990 A * 10/1980 Lert et al. .......................... 725/22
4,450,531 A *  5/1984 Kenyon et al. ..................... 708/5

(Continued)

OTHER PUBLICATIONS

"Speech Recognition in the Informedia Digital Video Library: USes and Limitations," by A. G. Hauptmann in Proceedings of the 7th IEEE Intl. Confrence on Tools with Artificial Intelligence, pp. 288-294, 1995.*

(Continued)

*Primary Examiner* — Pierre-Louis Desir
*Assistant Examiner* — Fariba Sirjani
(74) *Attorney, Agent, or Firm* — McDonnell Boehnen Hulbert & Berghoff LLP

(57) ABSTRACT

Systems and methods of synchronizing media are provided. A client device may be used to capture a sample of a media stream being rendered by a media rendering source. The client device sends the sample to a position identification module to determine a time offset indicating a position in the media stream corresponding to the sampling time of the sample, and optionally a timescale ratio indicating a speed at which the media stream is being rendered by the media rendering source based on a reference speed of the media stream. The client device calculates a real-time offset using a present time, a timestamp of the media sample, the time offset, and optionally the timescale ratio. The client device then renders a second media stream at a position corresponding to the real-time offset to be in synchrony to the media stream being rendered by the media rendering source.

34 Claims, 7 Drawing Sheets

(56) References Cited

U.S. PATENT DOCUMENTS

| | | | |
|---|---|---|---|
| 4,739,398 A * | 4/1988 | Thomas et al. | 725/22 |
| 4,746,994 A * | 5/1988 | Ettlinger | 360/13 |
| 4,843,562 A * | 6/1989 | Kenyon et al. | 702/73 |
| 5,046,004 A * | 9/1991 | Tsumura et al. | 84/601 |
| 5,134,719 A | 7/1992 | Mankovitz | |
| 5,136,655 A * | 8/1992 | Bronson | 704/270 |
| 5,210,820 A * | 5/1993 | Kenyon | 704/200 |
| 5,276,629 A * | 1/1994 | Reynolds | 702/71 |
| 5,333,275 A | 7/1994 | Wheatley et al. | |
| 5,436,653 A * | 7/1995 | Ellis et al. | 725/22 |
| 5,437,050 A | 7/1995 | Lamb et al. | |
| 5,465,240 A | 11/1995 | Mankovitz | |
| 5,574,962 A * | 11/1996 | Fardeau et al. | 455/2.01 |
| 5,577,249 A * | 11/1996 | Califano | 707/694 |
| 5,581,658 A * | 12/1996 | O'Hagan et al. | 706/20 |
| 5,584,006 A * | 12/1996 | Reber et al. | 711/100 |
| 5,634,020 A * | 5/1997 | Norton | 715/727 |
| 5,649,060 A * | 7/1997 | Ellozy et al. | 704/278 |
| 5,661,665 A * | 8/1997 | Glass et al. | 348/423.1 |
| 5,674,743 A | 10/1997 | Ulmer | |
| 5,721,827 A * | 2/1998 | Logan et al. | 709/217 |
| 5,740,230 A | 4/1998 | Vaudreuil | |
| 5,764,852 A * | 6/1998 | Williams | 704/243 |
| 5,765,132 A * | 6/1998 | Roberts | 704/254 |
| 5,801,685 A * | 9/1998 | Miller et al. | 715/202 |
| 5,822,729 A * | 10/1998 | Glass | 704/255 |
| 5,842,162 A * | 11/1998 | Fineberg | 704/233 |
| 5,869,783 A * | 2/1999 | Su et al. | 84/612 |
| 5,884,267 A * | 3/1999 | Goldenthal et al. | 704/270.1 |
| 5,889,224 A * | 3/1999 | Tanaka | 84/645 |
| 5,898,119 A * | 4/1999 | Tseng et al. | 84/610 |
| 5,900,908 A * | 5/1999 | Kirkland | 348/62 |
| 5,903,317 A * | 5/1999 | Sharir et al. | 348/589 |
| 5,918,223 A * | 6/1999 | Blum et al. | 1/1 |
| 5,925,843 A * | 7/1999 | Miller et al. | 84/609 |
| 5,952,597 A * | 9/1999 | Weinstock et al. | 84/610 |
| 5,987,525 A * | 11/1999 | Roberts et al. | 709/248 |
| 5,991,737 A * | 11/1999 | Chen | 705/26.8 |
| 5,999,173 A * | 12/1999 | Ubillos | 715/724 |
| 6,016,166 A * | 1/2000 | Huang et al. | 348/515 |
| 6,049,769 A * | 4/2000 | Holmes et al. | 704/278 |
| 6,107,559 A | 8/2000 | Weinstock et al. | |
| 6,121,530 A * | 9/2000 | Sonoda | 84/609 |
| 6,166,314 A | 12/2000 | Weinstock et al. | |
| 6,185,527 B1 * | 2/2001 | Petkovic et al. | 704/231 |
| 6,201,176 B1 * | 3/2001 | Yourlo | 84/609 |
| 6,243,676 B1 * | 6/2001 | Witteman | 704/243 |
| 6,260,011 B1 * | 7/2001 | Heckerman et al. | 704/235 |
| 6,272,461 B1 * | 8/2001 | Meredith et al. | 704/235 |
| 6,311,189 B1 * | 10/2001 | deVries et al. | 1/1 |
| 6,320,110 B1 * | 11/2001 | Ishikawa et al. | 84/600 |
| 6,336,093 B2 * | 1/2002 | Fasciano | 704/278 |
| 6,353,172 B1 * | 3/2002 | Fay et al. | 84/609 |
| 6,378,132 B1 * | 4/2002 | Grandin et al. | 725/146 |
| 6,389,467 B1 * | 5/2002 | Eyal | 709/223 |
| 6,434,520 B1 * | 8/2002 | Kanevsky et al. | 704/243 |
| 6,437,227 B1 * | 8/2002 | Theimer | 84/609 |
| 6,453,252 B1 * | 9/2002 | Laroche | 702/75 |
| 6,469,749 B1 * | 10/2002 | Dimitrova et al. | 348/722 |
| 6,473,778 B1 * | 10/2002 | Gibbon | 715/201 |
| 6,476,306 B2 * | 11/2002 | Huopaniemi et al. | 84/609 |
| 6,502,194 B1 * | 12/2002 | Berman et al. | 726/28 |
| 6,505,160 B1 * | 1/2003 | Levy et al. | 704/270 |
| 6,577,346 B1 * | 6/2003 | Perlman | 348/460 |
| 6,587,127 B1 * | 7/2003 | Leeke et al. | 715/765 |
| 6,606,744 B1 * | 8/2003 | Mikurak | 717/174 |
| 6,611,537 B1 * | 8/2003 | Edens et al. | 370/503 |
| 6,678,680 B1 * | 1/2004 | Woo | 1/1 |
| 6,721,706 B1 * | 4/2004 | Strubbe et al. | 704/275 |
| 6,728,682 B2 * | 4/2004 | Fasciano | 704/278 |
| 6,766,523 B2 | 7/2004 | Herley | |
| 6,792,007 B1 | 9/2004 | Hamada et al. | |
| 6,834,308 B1 * | 12/2004 | Ikezoye et al. | 709/231 |
| 6,911,592 B2 | 6/2005 | Futamase | |
| 6,966,065 B1 | 11/2005 | Kitazato et al. | |
| 6,990,453 B2 | 1/2006 | Wang et al. | |
| 6,993,245 B1 * | 1/2006 | Harville | 386/250 |
| 7,006,967 B1 * | 2/2006 | Kahn et al. | 704/235 |
| 7,010,485 B1 * | 3/2006 | Baumgartner et al. | 704/251 |
| 7,062,442 B2 * | 6/2006 | Berg et al. | 704/270 |
| 7,149,686 B1 * | 12/2006 | Cohen et al. | 704/241 |
| 7,157,638 B1 * | 1/2007 | Sitrick | 84/477 R |
| 7,174,293 B2 * | 2/2007 | Kenyon et al. | 704/231 |
| 7,190,971 B1 | 3/2007 | Kawamoto | |
| 7,194,752 B1 * | 3/2007 | Kenyon et al. | 725/22 |
| 7,257,536 B1 * | 8/2007 | Finley et al. | 704/270 |
| 7,277,766 B1 | 10/2007 | Khan et al. | |
| 7,343,553 B1 * | 3/2008 | Kaye | 704/244 |
| 7,346,472 B1 | 3/2008 | Moskowitz et al. | |
| 7,433,819 B2 * | 10/2008 | Adams et al. | 704/251 |
| 7,444,353 B1 * | 10/2008 | Chen et al. | 1/1 |
| 7,461,392 B2 | 12/2008 | Herley | |
| 7,523,474 B2 | 4/2009 | Herley | |
| 7,549,052 B2 | 6/2009 | Haitsma et al. | |
| 7,623,755 B2 * | 11/2009 | Kuspa | 386/282 |
| 7,627,477 B2 | 12/2009 | Wang | |
| 7,653,921 B2 | 1/2010 | Herley | |
| 7,660,700 B2 | 2/2010 | Moskowitz et al. | |
| 7,733,214 B2 | 6/2010 | Sarig et al. | |
| 7,788,279 B2 * | 8/2010 | Mohajer et al. | 707/772 |
| 7,836,389 B2 * | 11/2010 | Howard et al. | 715/202 |
| 7,849,131 B2 | 12/2010 | Van De Sluis | |
| 7,853,664 B1 * | 12/2010 | Wang et al. | 709/217 |
| 7,949,494 B2 | 5/2011 | Moskowitz et al. | |
| 8,205,148 B1 * | 6/2012 | Sharpe et al. | 715/203 |
| 8,214,175 B2 | 7/2012 | Moskowitz et al. | |
| 8,452,586 B2 * | 5/2013 | Master et al. | 704/200.1 |
| 8,686,271 B2 * | 4/2014 | Wang et al. | 84/600 |
| 8,688,600 B2 * | 4/2014 | Barton et al. | 705/500 |
| 8,737,679 B2 | 5/2014 | Subramanian et al. | |
| 2002/0072982 A1 | 6/2002 | Barton et al. | |
| 2002/0083060 A1 * | 6/2002 | Wang et al. | 707/10 |
| 2004/0266337 A1 * | 12/2004 | Radcliffe et al. | 455/3.06 |
| 2005/0086682 A1 * | 4/2005 | Burges et al. | 725/19 |
| 2005/0228663 A1 * | 10/2005 | Boman et al. | 704/235 |
| 2005/0267817 A1 | 12/2005 | Barton et al. | |
| 2006/0112812 A1 | 6/2006 | Venkataraman et al. | |
| 2006/0174348 A1 * | 8/2006 | Rhoads et al. | 726/26 |
| 2006/0246408 A1 * | 11/2006 | Gao | 434/307 A |
| 2007/0143777 A1 | 6/2007 | Wang | |
| 2007/0166683 A1 | 7/2007 | Chang et al. | |
| 2008/0097754 A1 | 4/2008 | Goto et al. | |
| 2008/0115655 A1 * | 5/2008 | Weng et al. | 84/609 |
| 2008/0196575 A1 | 8/2008 | Good | |
| 2008/0263360 A1 * | 10/2008 | Haitsma et al. | 713/180 |
| 2009/0083281 A1 * | 3/2009 | Sarig et al. | 707/10 |
| 2010/0050853 A1 * | 3/2010 | Jean et al. | 84/609 |
| 2010/0145708 A1 | 6/2010 | Master et al. | |
| 2010/0211693 A1 * | 8/2010 | Master et al. | 709/238 |
| 2010/0247060 A1 | 9/2010 | Gay et al. | |
| 2010/0268359 A1 | 10/2010 | Prestenback et al. | |
| 2010/0299131 A1 * | 11/2010 | Lanham et al. | 704/2 |
| 2011/0258211 A1 | 10/2011 | Kalisky et al. | |
| 2011/0273455 A1 * | 11/2011 | Powar et al. | 345/473 |
| 2011/0276157 A1 | 11/2011 | Wang et al. | |
| 2011/0307085 A1 | 12/2011 | Selby et al. | |
| 2012/0029670 A1 | 2/2012 | Mont-Reynaud et al. | |
| 2012/0239175 A1 | 9/2012 | Mohajer et al. | |
| 2013/0243205 A1 | 9/2013 | Wang | |

OTHER PUBLICATIONS

"A Procedure for Automatic Alignment of Phonetic Transcriptions With Continuous Speech," by H.C. Leung et al., Proceeding of ICASSP '84, pp. 2.7.1-2.7.3, 1984.*

"Integrated Image and Speech Analysis for Content Based Video Indexing," by Y-L. Chang et al., Proceedings of Multimedia 96, pp. 306-313, 1996.*

International Search Report and Written Opinion prepared by the European Patent Office in International Patent Application PCT/US2011/035197, mailed Aug. 29, 2011.

Kim et al., "Music Emotion Recognition: A state of the Art Review", 11th International Society for Music Information Retrieval Conference (2010).

(56) References Cited

OTHER PUBLICATIONS

Vy et al., "EnACT: A software tool for creating animated text captions", ICCHP 2008, LNCS 5105, pp. 609-616 (2008).

Geleijnse et al., "Enriching Music with Synchronized Lyrics, Images, and Colored Lights", Ambi-Sys'08, Feb. 11-14, 2008, Quebec, Canada.

Shi-Kuo Chang, Zen Chen, Suh-Yin Lee / Oostveen, J., et al., "Recent Advances in Visual Information Systems", 5th International Conference, VISUAL 2002, "Feature Extraction and a Database Strategy for Video Fingerprinting", Lecture Notes in Computer Science, 2314, (Mar. 11, 2002), 117-128.

Macrae et al., "MuViSync: Realtime Music Video Alignment", available from http://www.xavieranguera.com/papers/icme2010.pdf, at least on Dec. 2, 2010.

Kan et al., "LyricAlly: Automatic Synchronization of Textual Lyrics to Acoustic Music Signals", IEEE Transactions on Audio, Speech and Language Processing, vol. 16, No. 2, Feb. 2008, pp. 338-349.

Mesaros, "Automatic Alignment of Music Audio and Lyrics", Proc. of the 11th Int. Conference on Digital Audio Effects (DAFx-08), Espoo, Finland, Sep. 1-4, 2008, pp. DAFX-1-4.

Young et al., The HTK Book (for HTK Version 3.4), first published Dec. 1995.

Fujihara et al., "Three Techniques for Improving Automatic Synchronization Between Music and Lyrics: Fricative Detection, Filler, Model, and Novel Feature Vectors for Vocal Activity Detection", National Institute of Advanced Industrial Science and Technology, 2008, pp. 69-72.

Fujihara et al., "Automatic Synchronization Between Lyrics and Music CD Recordings based on Viterbi Alignment of Segragated Vocal Signals", Proceedings of the Eighth IEEE International Symposium on Multimedia, 2006.

http://waltdisneyworldflorida.net/walt-disney-news/walt-disney-tron-bambi-to-employ-disneys-second-screen-technology-on-dvd-blu-ray/, visited and printed from Internet May 4, 2011.

http://www.razorianfly.com/2011/02/12/details-on-tron-legacy-for-blu-ray-surface-disneys-second-screen-for-ipad/, visited and printed from internet on May 4, 2011.

International Preliminary Report on Patentability and Written Opinion prepared by the European Patent Office in International Patent Application PCT/US2011/035197, mailed Nov. 15, 2012.

* cited by examiner

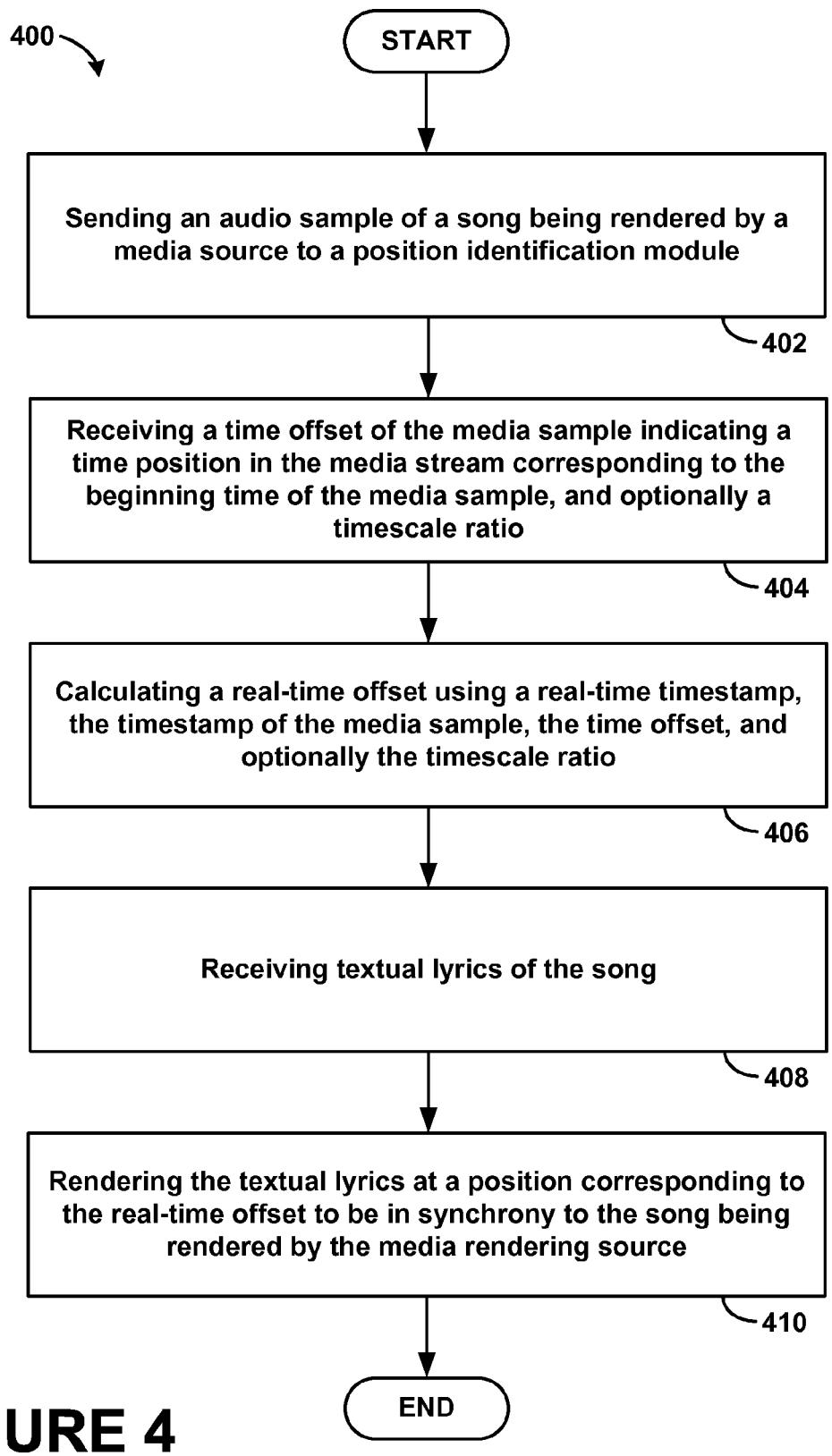

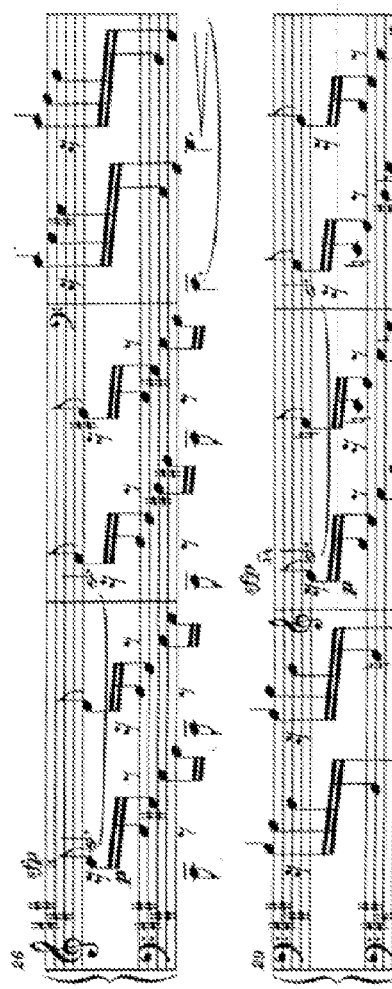
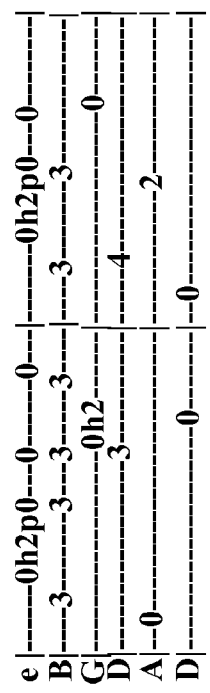
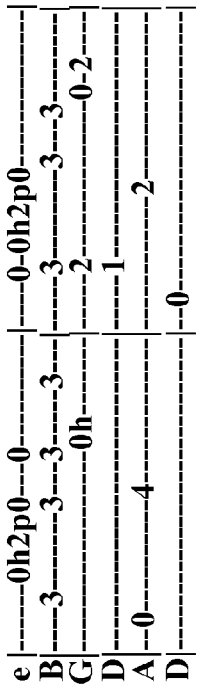
Musical Notation 502
Guitar Tabs 504
FIGURE 5

METHODS AND SYSTEMS FOR SYNCHRONIZING MEDIA

CROSS-REFERENCE TO RELATED APPLICATION

The present application claims priority to U.S. patent application Ser. No. 13/193,205, filed on Jul. 28, 2011, which is a continuation of U.S. patent application Ser. No. 12/204,526, filed on Sep. 4, 2008, which is a continuation of U.S. patent application Ser. No. 11/188,385, filed on Jul. 25, 2005, which is a continuation of U.S. patent application Ser. No. 09/734,949, filed on Dec. 12, 2000, and the entire contents of each of these patent applications are herein incorporated by reference. The present application claims priority to U.S. Provisional Patent Application Ser. No. 61/331,015, filed on May 4, 2010, the entire contents of which are herein incorporated by reference.

FIELD

The present disclosure relates to media information retrieval and synchronization of media. For example, the present disclosure relates to music information retrieval and textual transcription or lyric synchronization, for example, as in the fields of Karaoke. The present disclosure also relates to synchronization of other forms of media as well.

BACKGROUND

Synchronized media, such as musical lyrics display systems, typically include a lyrics display apparatus operatively coupled to and controlled by a music playback apparatus. In these systems, the music playback apparatus knows a current time position in a currently playing music audio track. The music audio time position is provided to the lyrics display apparatus. The lyrics display apparatus uses the timing information to determine a corresponding lyric text position and displays the corresponding lyric text for the user to enjoy in synchrony with the music audio. Widely available Karaoke systems operate in this way.

Existing synchronized media (e.g., lyrics) systems typically have the lyrics display apparatus designed as an integral part of a system including the music playback apparatus often in a shared physical enclosure or controlled by a shared control mechanism, such as a computer program. A music listener who comes upon an arbitrary environmental or ambient source of music, e.g., in a café, restaurant, car, store, etc., would not have a way to enjoy synchronized media (e.g., lyrics) unless the music playback apparatus at the arbitrary environmental or ambient source was operatively coupled to an integrated lyrics display apparatus.

SUMMARY

In one aspect, a method of synchronizing media is provided. The method includes a client device receiving a media sample of a media stream being rendered by a media rendering source that is associated with a timestamp corresponding to a sampling time of the media sample. The method also includes determining a time offset indicating a time position in the media stream corresponding to the sampling time of the media sample, and calculating a real-time offset using a real-time timestamp, the timestamp of the media sample, and the time offset, wherein the real-time timestamp indicates a present time. The method further includes the client device rendering a second media stream at a position corresponding to the real-time offset to be in synchrony to the media stream being rendered by the media rendering source.

In another aspect, a method of synchronizing media is provided. The method includes a client device sending an audio sample of a song being rendered by a media rendering source to a position identification module. The audio sample is associated with a timestamp corresponding to a sampling time of the audio sample. The method also includes the client device receiving from the position identification module a time offset indicating a time position in the song corresponding to the sampling time of the audio sample. The method further includes calculating a real-time offset using a real-time timestamp, the timestamp of the audio sample, and the time offset, wherein the real-time timestamp indicates a present time, receiving textual lyrics of the song, and the client device rendering the textual lyrics at a position corresponding to the real-time offset to be in synchrony to the song being rendered by the media rendering source.

In still another aspect, a non-transitory computer readable storage medium having stored therein instructions executable by a computing device to cause the computing device to perform functions is provided. The functions include a client device sending an audio sample of a song being rendered by a media rendering source to a position identification module. The audio sample is associated with a timestamp corresponding to a sampling time of the audio sample. The functions also include the client device receiving from the position identification module a time offset indicating a time position of the sample corresponding to the sampling time of the audio sample in the song. The functions further include calculating a real-time offset using a real-time timestamp, the timestamp of the audio sample, and the time offset, wherein the real-time timestamp indicates a present time, receiving textual lyrics of the song, and the client device rendering the textual lyrics at a position corresponding to the real-time offset to be in synchrony to the song being rendered by the media rendering source.

In yet other aspects, example devices or systems to perform methods described herein are provided.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 4 shows a flowchart of an illustrative embodiment of a method for synchronizing lyrics to a song being rendered by a media rendering source.

FIG. 5 illustrates examples of music information.

DETAILED DESCRIPTION

Figure 1:
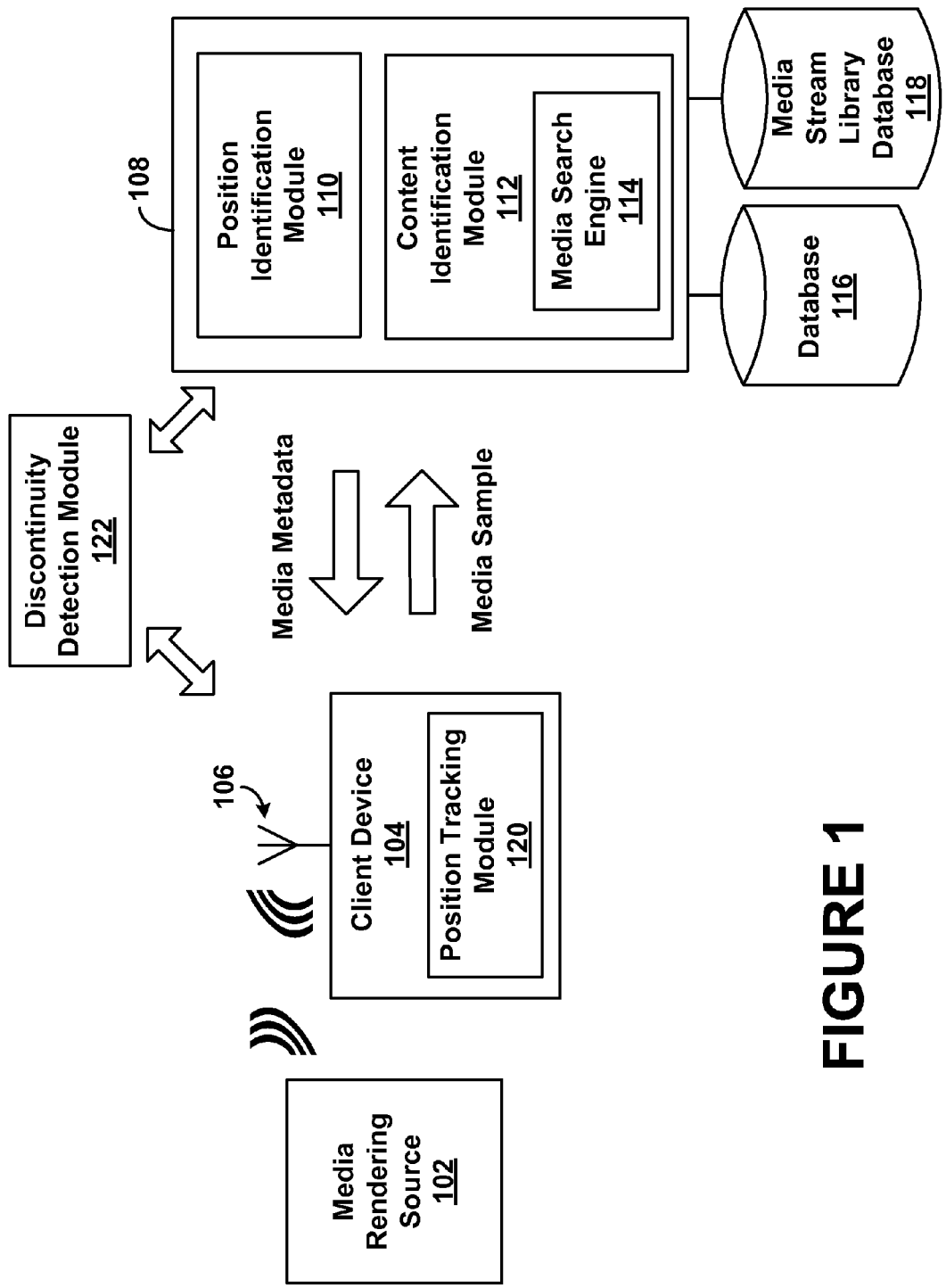
FIG. 1 illustrates one example of a system for identifying media content, and synchronizing data with the identified media content.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In example embodiments, systems and methods of synchronizing media are provided. A client device (e.g., such as a portable client device) may be used to capture a sample of a media stream being rendered by a media rendering source. The client device may determine a timestamp corresponding to a sampling time of the media sample being captured using a reference time clock. The sampling time may preferably be the beginning, but could also be an ending, middle, or any other predetermined time of the media sample. The client device can send the media sample to a position identification module to determine a time offset indicating a time position in the media stream corresponding to the sampling time of the media sample, and optionally to determine a timescale ratio that indicates a speed at which the media stream is being rendered by the media rendering source based on a reference speed of the media stream. The client device can calculate a real-time offset using a real-time timestamp indicating the present time, the timestamp of the media sample, the time offset, and optionally, the timescale ratio. The client device can then render a second media stream at a position corresponding to the real-time offset to be in synchrony to the media stream being rendered by the media rendering source. The systems and methods described herein can be performed to control synchronized playback of a second media stream based on captured samples of a first media stream, for example. In other examples, the client device includes a microphone to receive the media stream or recording from the media rendering source. The client device can also include any of a video camera, vibration sensor, radio receiver, network interface, etc., to receive the media stream.

In one example, the systems and methods may be used to display lyrics synchronized to ambiently playing music using a mobile music information retrieval device that may not be operationally coupled to a music playback apparatus (the apparatus playing the ambient music) to determine timing information corresponding to the played music. No timing information from the music playback apparatus is needed. The music information retrieval device may be configured to identify the playing music, and to responsively retrieve and display corresponding lyrics synchronized to a current time point in the music without user intervention, for example.

Referring now to the figures, FIG. 1 illustrates one example of a system for identifying media content, and synchronizing data with the identified media content. The system includes a media rendering source 102 that renders and presents media content from a media stream in any known manner. The media stream may be stored on the media rendering source 102 or received from external sources, such as an analog or digital broadcast. In one example, the media rendering source 102 may be a radio station or a television content provider that broadcasts media streams (e.g., audio and/or video) and/or other information. The media rendering source 102 may also be any type of device that plays audio media, displays video media in a recorded or live format. In an alternate embodiment, the media rendering source 102 may include a live performance as a source of audio and/or a source of video, for example.

The media rendering source 102 may render or present the media stream through a graphical display, audio speakers, a MIDI musical instrument, an animatronic puppet, etc., or any other kind of presentation provided by the media rendering source 102, for example.

A client device 104 receives a rendering of the media stream from the media rendering source 102 through a sample capture module encompassing a media receiver 106. In FIG. 1, the media receiver 106 is shown to be an antenna, and the media rendering source 102 broadcasts the media stream wirelessly to the client device 104. However, depending on a form of the media stream, the media rendering source 102 may render the media using wireless or wired communication techniques.

In other examples, the media receiver 106 can include any of a microphone, video camera, vibration sensor, radio receiver, network interface, etc. As a specific example, the media rendering source 102 may play music, and the client device 104 may include a microphone to receive a sample of the music.

The client device 104 is not operationally coupled to the media rendering source 102, other than to receive the rendering of the media stream. In this manner, the client device 104 is not controlled by the media rendering source 102, nor is the client device 104 an integral portion of the media rendering source 102. In the example shown in FIG. 1, the client device 104 is a separate entity from the media rendering source 102.

The client device 102 captures a media sample of the rendered media stream. This may occur automatically without user intervention or may be effected by a user activating a button or other application to trigger the sample capture. For example, the user of the client device 104 may press a button to record a 10 second digital sample of audio through a microphone, or to capture a still image or video sequence using a camera.

The client device 104 can be implemented as a portion of a small-form factor portable (or mobile) electronic device such as a cell phone, a wireless cell phone, a personal data assistant (PDA), a personal media player device, a wireless web-watch device, a personal headset device, an application specific device, or a hybrid device that include any of the above functions. The client device 104 can also be implemented as a personal computer including both laptop computer and non-laptop computer configurations. The client device 104 can also be a component of a larger device or system as well.

The client device 104 is operated to capture portions of the media stream rendered by the media rendering source 102 for identification of position information. As an example, the client device 104 is operationally coupled to a server 108 that includes a position identification module 110 and an optional content identification module 112. Although FIG. 1 illustrates the server 108 to include both the position identification module 110 and the content identification module 112, either of the position identification module 110 and/or the content identification module 112 may be separate entities apart from the server 108, for example. Alternatively, both the position identification module 110 and the content identification module 112 may be the same entity, or functions of the position identification module 110 and the content identification module 112 may be performed by the same entity. In addition, the position identification module 110 and/or the content identification module 112 may be located in the client device 104 or may be on a remote server connected to the client device 104 over a network, as shown in FIG. 1.

The server 108 receives a media sample from the client device 104 (either over a wired or wireless connection), and the position identification module 110 identifies a corresponding estimated time position ($T_S$) indicating a time offset of the media sample into the media stream based on the media sample that is being captured at that moment. $T_S$ may also, in some examples, be an elapsed amount of time from a beginning of the media stream.

The content identification module 112 may optionally also perform a content identification on the received media sample. The content identification identifies content in a media stream, e.g., a musical soundtrack, if the identity is not already known. The content identification module 112 may used or be incorporated within any of the example media sample information retrieval systems, such as provided by Shazam Entertainment in London, United Kingdom, Gracenote in Emeryville, Calif., or Melodis in San Jose, Calif., for example. These services operate to receive samples of environmental audio, identify a musical content of the audio sample, and provide the user with information about the music, including the track name, artist, album, artwork, biography, discography, concert tickets, etc.

In this regard, the content identification module 112 includes a media search engine 114 and may include or have access to a database 116 that indexes reference media content objects and recordings, for example, musical soundtracks, video clips, movies, and television shows, to compare the received media sample with the stored information so as to identify media content within the received media sample. Once a media object within the media stream has been identified, identity information and other metadata may be reported back to the client device 104.

Metadata may also comprise data and hyperlinks to other related content and services, including recommendations, ads, offers to preview, bookmark, and buy musical recordings, videos, concert tickets, and bonus content; as well as to facilitate browsing, exploring, discovering related content on the world wide web.

Alternatively, the client device 104 may capture a sample of a media stream from the media rendering source 102, and perform initial feature extraction processing on the sample so as to create a fingerprint of the media sample. The client device 104 could then send the fingerprint information to the position identification module 110 and/or the content identification module 112, which may identify information pertaining to the sample based on the fingerprint information alone. In this manner, more computation or identification processing can be performed at the client device 104, rather than at the position identification module 110 and/or the content identification module 112, for example.

As mentioned, the database 116 may include many media content objects, each of which may be identified by a unique identifier (e.g., sound_ID). The database 116 may not necessarily store actual media content, such as audio or video files, for each recording, since the sound_IDs can be used to retrieve the files from elsewhere. However, the database 116 may store media content files in some embodiments. A media content database index may be very large, containing indices for millions or even billions of files, for example. New content can be added incrementally to the database index.

The database 116 may also include information for each stored audio, video, or media file, or for each stored media index. For example, metadata may be stored with each file that indicates information about the file, such as an artist name, a length of song, lyrics of the song, time indices for lines or words of the lyrics, album artwork, or any other identifying or related information to the file.

The system of FIG. 1 allows time offsets of captured media samples to be identified, and also for media samples to be identified based on stored information. While FIG. 1 illustrates a system that has a given configuration, the components within the system may be arranged in other manners. For example, the media search engine 114 may be separate from the content identification module 112, or media sample processing can occur at the client 104 or at the server 108. Thus, it should be understood that the configurations described herein are merely exemplary in nature, and many alternative configurations might also be used.

The system in FIG. 1, and in particular the position identification module 110, may identify time offsets of media samples within a media stream. Optionally, the system can be used to identify content in a media stream using samples of the media within the media stream using the content identification module 112.

Various media sample identification techniques are known in the art for performing computational content identifications of media samples and features of media samples using a database of media content objects. The following U.S. patents and publications describe possible examples for media recognition techniques, and each is entirely incorporated herein by reference, as if fully set forth in this description: Kenyon et al, U.S. Pat. No. 4,843,562, entitled "Broadcast Information Classification System and Method"; Kenyon, U.S. Pat. No. 4,450,531, entitled "Broadcast Signal Recognition System and Method"; Haitsma et al, U.S. Patent Application Publication No. 2008/0263360, entitled "Generating and Matching Hashes of Multimedia Content"; Wang and Culbert, U.S. Pat. No. 7,627,477, entitled "Robust and Invariant Audio Pattern Matching"; Wang, Avery, U.S. Patent Application Publication No. 2007/0143777, entitled "Method and Apparatus for Identification of Broadcast Source"; Wang and Smith, U.S. Pat. No. 6,990,453, entitled "System and Methods for Recognizing Sound and Music Signals in High Noise and Distortion"; and Blum, et al, U.S. Pat. No. 5,918,223, entitled "Method and Article of Manufacture for Content-Based Analysis, Storage, Retrieval, and Segmentation of Audio Information".

Briefly, identifying a media recording begins by receiving a media recording and sampling the media recording. The recording is correlated with digitized, normalized reference signal segments to obtain correlation function peaks for each resultant correlation segment, providing a recognition signal when the spacing between the correlation function peaks is within a predetermined limit, and a pattern of RMS power values coincident with the correlation function peaks matches within predetermined limits of a pattern of the RMS power values from the digitized reference signal segments, as noted in U.S. Pat. No. 4,450,531, for example. The matching media content is thus identified. Furthermore, the matching position of the media recording in the media content is given by the position of the matching correlation segment, as well as the offset of the correlation peaks, for example.

In another example, generally, media content can be identified by identifying or computing characteristics or fingerprints of a media sample and comparing the fingerprints to previously identified fingerprints. The particular locations within the sample at which fingerprints are computed depend on reproducible points in the sample. Such reproducibly computable locations are referred to as "landmarks." A location within the sample of the landmarks can be determined by the sample itself, i.e., is dependent upon sample qualities and is reproducible. That is, the same or similar landmarks may be computed for the same signal each time the process is repeated. A landmarking scheme may mark about 5 to about 10 landmarks per second of sound recording; however, landmarking density depends on an amount of activity within the media recording. One landmarking technique, known as Power Norm, is to calculate an instantaneous power at many time points in the recording and to select local maxima. One way of doing this is to calculate an envelope by rectifying and filtering a waveform directly. Another way is to calculate a Hilbert transform (quadrature) of a signal and use a sum of magnitudes squared of the Hilbert transform and the original signal. Other methods for calculating landmarks may also be used.

Once the landmarks have been computed, a fingerprint is computed at or near each landmark time point in the recording. A nearness of a feature to a landmark is defined by the fingerprinting method used. In some cases, a feature is considered near a landmark if the feature clearly corresponds to the landmark and not to a previous or subsequent landmark. In other cases, features correspond to multiple adjacent landmarks. The fingerprint is generally a value or set of values that summarizes a set of features in the recording at or near the time point. In one embodiment, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks.

Fingerprints can be computed by any type of digital signal processing or frequency analysis of the signal. In one example, to generate spectral slice fingerprints, a frequency analysis is performed in the neighborhood of each landmark timepoint to extract the top several spectral peaks. A fingerprint value may then be the single frequency value of a strongest spectral peak. For more information on calculating characteristics or fingerprints of audio samples, the reader is referred to U.S. Pat. No. 6,990,453, to Wang and Smith, entitled "System and Methods for Recognizing Sound and Music Signals in High Noise and Distortion," the entire disclosure of which is herein incorporated by reference as if fully set forth in this description.

Thus, the content identification module 112 will receive a sample and compute fingerprints of the sample. The content identification module 112 may compute the fingerprints by communicating with additional recognition engines. To identify the sample, the content identification module 112 can then access the database 116 to match the fingerprints of the sample with fingerprints of known audio tracks by generating correspondences between equivalent fingerprints and files in the database 116 to locate a file that has the largest number of linearly related correspondences, or whose relative locations of characteristic fingerprints most closely match the relative locations of the same fingerprints of the sample. That is, linear correspondences between the landmark pairs are identified, and sets are scored according to the number of pairs that are linearly related. A linear correspondence may occur when a statistically significant number of corresponding sample locations and file locations can be described with substantially the same linear equation, within an allowed tolerance, for example. The file of the set with the highest statistically significant score, i.e., with the largest number of linearly related correspondences, is the winning file, and is deemed the matching media file.

As yet another example of a technique to identify content within the media stream, a media sample can be analyzed to identify its content using a localized matching technique. For example, generally, a relationship between two media samples can be characterized by first matching certain fingerprint objects derived from the respective samples. A set of fingerprint objects, each occurring at a particular location, is generated for each media sample. Each location is determined depending upon the content of a respective media sample and each fingerprint object characterizes one or more local features at or near the respective particular location. A relative value is next determined for each pair of matched fingerprint objects. A histogram of the relative values is then generated. If a statistically significant peak is found, the two media samples can be characterized as substantially matching. Additionally, a time stretch ratio, which indicates how much an audio sample has been sped up or slowed down as compared to the original audio track can be determined. For a more detailed explanation of this method, the reader is referred to U.S. Pat. No. 7,627,477, to Wang and Culbert, entitled Robust and Invariant Audio Pattern Matching, the entire disclosure of which is herein incorporated by reference as if fully set forth in this description.

In addition, systems and methods described within the publications above may return more than just the identity of a media sample. For example, using the method described in U.S. Pat. No. 6,990,453 to Wang and Smith may return, in addition to metadata associated with an identified audio track, a relative time offset (RTO) of a media sample from a beginning of an identified sample, referred to as an estimated identified media stream position $T_S$. To determine a relative time offset of the recording, fingerprints of the sample can be compared with fingerprints of the original files to which the fingerprints match. Each fingerprint occurs at a given time, so after matching fingerprints to identify the sample, a difference in time between a first fingerprint (of the matching fingerprint in the sample) and a first fingerprint of the stored original file will be a time offset of the sample, e.g., amount of time into a song. Thus, a relative time offset (e.g., 67 seconds into a song) at which the sample was taken can be determined. Other information may be used as well to determine the RTO. For example, a location of a histogram peak may be considered the time offset from a beginning of the reference recording to the beginning of the sample recording.

Other forms of content identification may also be performed depending on a type of the media sample. For example, a video identification algorithm may be used to identify a position within a video stream (e.g., a movie). An example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference. For example, a position of the video sample into a video can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. The extracted fingerprint bits from a frame may be referred to as sub-fingerprints, and a fingerprint block is a fixed number of sub-fingerprints from consecutive frames. Using the sub-fingerprints and fingerprint blocks, identification of video samples can be performed. Based on which frame the media sample included, a position into the video (e.g., time offset) can be determined Furthermore, other forms of content and/or position identification may also be performed, such as using watermarking methods. A watermarking method can be used by the position identification module 110 to determine the time offset such that the media stream may have embedded watermarks at intervals, and each watermark specifies a time or position of the watermark either directly, or indirectly via a database lookup, for example. Alternatively, if the media stream includes embedded watermarks that indicate, either directly or indirectly, a time or position offset value, the client device 104 may determine the time offset of a sample of the media being rendered without communication with the position identification module 110.

In each of the foregoing example content identification methods for implementing functions of the content identification module 112, a byproduct of the identification process may be a time offset of the media sample within the media stream (e.g., estimated identified media stream position $T_S$). Thus, in these cases, the position identification module 110 may be the same as the content identification module 112, or functions of the position identification module 110 may be performed by the content identification module 112.

Thus, a user may send from the client device 104 a position identification query to the position identification module 110, which may use any of the techniques described herein to return information relating to the content to the client device 104, and optionally, the content identification module 112 may be accessed to identify the content. Example embodiments described herein apply to any type of media stream, such as for example, pre-recorded or live music, audio, video, a combination of audio and video, or any other kind of media or event sequences that follow a timeline of positions in the media stream. Example embodiments also apply to any format of the media stream such as, for example, media on CDs, DVDs, compressed digital media, MIDI files, animation sequences, control sequences, scripts, slide shows, etc.

In other examples, the client device 104 or the server 108 may further access a media stream library database 118 to select a media stream corresponding to the sampled media that may then be returned to the client device 104 to be rendered by the client device 104. The media stream library database 118 may be located in the client device 104 or in the server 108, or alternatively either or both of the client device 104 and the server 108 may be connected to the media stream library database 118 over a network. In FIG. 1, the media stream library database 118 is shown to be connected to the server 108, for example. Still further, information in the media stream library database 118, or the media stream library database 118 itself, may be included within the database 116.

A media stream in the media stream library database 118 corresponding to the media sample may be manually selected by a user of the client device 104, programmatically by the client device 104, or selected by the server 108 based on an identity of the media sample determined by the content identification module 112, for example. The selected media stream may be a different kind of media from the media sample, and may be synchronized to the media being rendered by the media rendering source 102. For example, the media sample may be music, and the selected media stream may be lyrics, a musical score, a guitar tablature, musical accompaniment, a video, animatronic puppet dance, an animation sequence, etc., which can be synchronized to the music. The client device 104 may receive the selected media stream corresponding to the media sample, and may render the selected media stream in synchrony with the media being rendered by the media rendering source 102.

An estimated time position of the media being rendered by the media rendering source 102 is determined by the position identification module 110 and used to determine a corresponding position within the selected media stream at which to render the selected media stream. The client device 104 can then render and present the selected media stream in synchrony with the media being rendered by the media rendering source 102.

The client device 104 may include a position tracking module 120 to ensure accurate synchronization between the two media streams. When the client device 104 is triggered to capture a media sample, a timestamp ($T_0$) is recorded from a reference clock of the client device 104. At any time t, an estimated real-time media stream position $T_r(t)$ is determined from the estimated identified media stream position $T_S$ plus elapsed time since the time of the timestamp:

$$T_r(t) = T_S + t - T_0 \qquad \text{Equation (1)}$$

$T_r(t)$ is an elapsed amount of time from a reference point, such as a beginning, of the media stream to a real-time position of the media stream as is currently being rendered. Thus, using $T_S$ (i.e., the estimated elapsed amount of time from a beginning of the media stream to a position of the media stream based on the recorded sample), the $T_r(t)$ can be calculated. $T_r(t)$ is then used by the client device 104 to present the selected media stream in synchrony with the media being rendered by the media rendering source 102. For example, the client device 104 may begin rendering the selected media stream at the time position $T_r(t)$, or at a position such that $T_r(t)$ amount of time has elapsed.

The position tracking may fall out of synchrony for many reasons. In one instance, the media stream may be rendered by the media rendering source 102 at an unexpected speed. For example, if a musical recording is being played on an uncalibrated turntable or CD player, the music recording could be played faster or slower than an expected reference speed, or in a manner differently from the stored reference media stream. Or, sometimes a DJ may change a speed of a musical recording intentionally to achieve a certain effect, such as matching a tempo across a number of tracks. In such instances, the estimated position $T_r(t)$ can become incorrect as t increases, and consequently, the selected media stream may be out of sync. As examples of reference speeds, a CD player is expected to be rendered at 44100 samples per second; a 45 RPM vinyl record is expected to play at 45 revolutions per minute on a turntable; and an NTSC video stream is expected to play at 60 frames per second.

In some embodiments, to mitigate or prevent the selected media stream from falling out of synchrony with the media being rendered by the media rendering source 102, the estimated position $T_r(t)$ can be adjusted according to a speed adjustment ratio R. For example, methods described in U.S. Pat. No. 7,627,477, entitled "Robust and invariant audio pattern matching", the entire contents of which are herein incorporated by reference, can be performed to identify the media sample, the estimated identified media stream position $T_S$, and a speed ratio R.

To estimate the speed ratio R, cross-frequency ratios of variant parts of matching fingerprints are calculated, and because frequency is inversely proportional to time, a cross-time ratio is the reciprocal of the cross-frequency ratio. A cross-speed ratio R is the cross-frequency ratio (e.g., the reciprocal of the cross-time ratio).

More specifically, using the methods described above, a relationship between two audio samples can be characterized by generating a time-frequency spectrogram of the samples (e.g., computing a Fourier Transform to generate frequency bins in each frame), and identifying local energy peaks of the spectrogram. Information related to the local energy peaks is extracted and summarized into a list of fingerprint objects, each of which optionally includes a location field, a variant component, and an invariant component. Certain fingerprint objects derived from the spectrogram of the respective audio samples can then be matched. A relative value is determined for each pair of matched fingerprint objects, which may be, for example, a quotient or difference of logarithm of parametric values of the respective audio samples.

In one example, local pairs of spectral peaks are chosen from the spectrogram of the media sample, and each local pair comprises a fingerprint. Similarly, local pairs of spectral peaks are chosen from the spectrogram of a known media stream, and each local pair comprises a fingerprint. Matching fingerprints between the sample and the known media stream are determined, and time differences between the spectral peaks for each of the sample and the media stream are calculated. For instance, a time difference between two peaks of the sample is determined and compared to a time difference between two peaks of the known media stream. A ratio of these two time differences can be determined and a histogram can be generated comprising such ratios (e.g., extracted from matching pairs of fingerprints). A peak of the histogram may be determined to be an actual speed ratio (e.g., ratio between the speed at which the media rendering source 102 is playing the media compared to the reference speed at which a reference media file is rendered). Thus, an estimate of the speed ratio R can be obtained by finding a peak in the histogram, for example, such that the peak in the histogram characterizes the relationship between the two audio samples as a relative pitch, or, in case of linear stretch, a relative playback speed.

Alternatively, a relative value may be determined from frequency values of matching fingerprints from the sample and the known media stream. For instance, a frequency value of an anchor point of a pair of spectrogram peaks of the sample is determined and compared to a frequency value of an anchor point of a pair of spectrogram peaks of the media stream. A ratio of these two frequency values can be determined and a histogram can be generated comprising such ratios (e.g. extracted from matching pairs of fingerprints). A peak of the histogram may be determined to be an actual speed ratio R. In equations, $$R_f = \frac{f_{sample}}{f_{stream}} \qquad \text{Equation (2)}$$

where $f_{sample}$ and $f_{stream}$ are variant frequency values of matching fingerprints, as described by Wang and Culbert, U.S. Pat. No. 7,627,477, the entirety of which is hereby incorporated by reference.

Thus, the global relative value (e.g., speed ratio R) can be estimated from matched fingerprint objects using corresponding variant components from the two audio samples. The variant component may be a frequency value determined from a local feature near the location of each fingerprint object. The speed ratio R could be a ratio of frequencies or delta times, or some other function that results in an estimate of a global parameter used to describe the mapping between the two audio samples. The speed ratio R may be considered an estimate of the relative playback speed, for example.

The speed ratio R can be estimated using other methods as well. For example, multiple samples of the media can be captured, and content identification can be performed on each sample to obtain multiple estimated media stream positions $T_S(k)$ at reference clock time $T_0(k)$ for the k-th sample. Then, R could be estimated as:

$$R_k = \frac{T_S(k) - T_S(1)}{T_0(k) - T_0(1)} \qquad \text{Equation (3)}$$

To represent R as time-varying, the following equation may be used:

$$R_k = \frac{T_S(k) - T_S(k-1)}{T_0(k) - T_0(k-1)} \qquad \text{Equation (4)}$$

Thus, the speed ratio R can be calculated using the estimated time positions $T_S$ over a span of time to determine the speed at which the media is being rendered by the media rendering source 102.

Using the speed ratio R, an estimate of the real-time media stream position can be calculated as:

$$T_r(t) = T_S + R(t - T_0) \qquad \text{Equation (5)}$$

The real-time media stream position indicates the position in time of the media sample. For example, if the media sample is from a song that has a length of four minutes, and if $T_r(t)$ is one minute, that indicates that the one minute of the song has elapsed.

The system in FIG. 1 may further include a discontinuity detection module 122, which may be included within the client device 104 and/or the server 108, or functions of the discontinuity detection module 122 may optionally be performed by components of the client device 104 and/or components of the server 108, for example. Alternatively, as shown in FIG. 1, the discontinuity detection module 122 may be a separate entity that communicates with the client device 104 and/or the server 108 using wireless or wired communication techniques, for example.

The discontinuity detection module 122 may detect if the media stream being rendered by the media rendering source 102 is interrupted unexpectedly. This may occur, for example, if a channel is changed on the media rendering source 102, or if someone stops playout of the media stream or skips to a different position in the media stream. If the selected media stream from the media stream library database 118 were to continue to play, the two media streams would be out of sync or disconnected. The discontinuity detection module 122 may either stop the selected media stream or attempt to resynchronize the two media streams. Thus, the discontinuity detection module 122 may verify whether the selected media stream is being rendered in synchrony with the media stream being rendered by the media rendering source 102.

The discontinuity detection module 122 functions may be implemented by performing periodic position and/or content identification samplings as outlined above as an example method to calculate the speed ratio R, and thus, the discontinuity detection module 122 may communicate with the server 108. If at some point, content identifications are no longer successful, the media stream being rendered by the media rendering source 102 has stopped. Or, if a different media stream is identified then perhaps a channel changed, a new track is being played, etc.

To determine discontinuities in a media stream being rendered by the media rendering source 102, the discontinuity detection module 122 can periodically receive media samples from the client device 104 and perform fingerprint extraction on the media samples. The discontinuity detection module 122 may also receive information from the position identification module 110 including an alignment file that includes a number of fingerprints of the reference media stream throughout the media stream. The discontinuity detection module 122 may then compare the extracted fingerprints from the periodically received media samples to the fingerprints in the alignment file to determine if the media stream being rendered by the media rendering source 102 has been interrupted. When no identifiable fingerprint matches are found, the discontinuity detection module 122 may determine that the media stream has been interrupted or ended.

Fingerprint matching can also be performed using, for example, methods described above, or as described in U.S. Pat. No. 6,990,453, to Wang and Smith.

In addition, the discontinuity detection module 122 may have knowledge of the content identification of the media stream (from the content identification module 112), and thus, may receive a file of fingerprints for the media stream. The discontinuity detection module 122 will anticipate certain fingerprints to appear in the samples at predetermined times, and if the expected fingerprints are not seen, then a discontinuity may be determined. For example, if a certain amount of time has passed with no predetermined fingerprint matches, then a discontinuity can be determined.

Upon determining a type of discontinuity, the discontinuity detection module 122 can do one of several things. In one example, based on detection of a speed drift, the discontinuity detection module 122 can make an adjustment to the speed ratio R so as to perform a resynchronization of the media streams. In another example, based on detection of a large discontinuity, the discontinuity detection module 122 can use the position identification module 110 to realign the media streams so as to perform a resynchronization of the media streams. In still another example, the discontinuity detection module 122 can use the content identification module 112 to detect a new media stream and choose a different matched media stream and a new position within the new stream for synchronization. In yet another example, if position and/or content identifications fail, the discontinuity detection module 122 can instruct the client device 104 to stop rendering the selected media.

The client device 104 may receive a notification from the discontinuity detection module 122 and then stop displaying the selected media stream or change to display a new media stream selected from the media stream library database 118 synchronized to the new media stream being rendered from the media rendering source 102, for example.

The discontinuity detection module 122 may alternatively thus perform or instruct the client device 104 to perform updates on alignment of the selected media from the media stream library database 118 with the media being rendered by the media rendering source 102. The discontinuity detection module 122 may determine, based on a mis-predicted alignment of fingerprint matches, an offset value at which to adjust the rendering of the selected media on the client device 104 so that the selected media is realigned and synchronized with the rendering of the media stream by the media rendering source 102.

Alternatively, if the discontinuity detection module 122 no longer identifies matching fingerprints from the periodically received media samples to the fingerprints in the alignment file, the discontinuity detection module 122 may inform the client device 104 to perform a resynchronization of the selected media from the media stream library database 118 with the media being rendered by the media rendering source 102. To do so, the client device 104 may re-perform the method of capturing a new sample of the media and sending the new sample to the position identification module 110 to determine the time offset.

Still, alternatively, based on the continued absence of fingerprint matches, the discontinuity detection module 122 may determine that the media stream is no longer being rendered, for example if the position detection module 110 detects no matching time offset, and thus, may instruct the client device 104 to stop rendering the selected media or to perform a new content identification, for example. The client device 104 may send the new sample to the content identification module 112 to identify a new media stream being rendered by the media rendering source 102. If the identified media stream has changed then the client device 104 may select a new media stream from the media stream library database 118 corresponding to the media sample to be rendered in synchrony by the client device 104.

Figure 2:
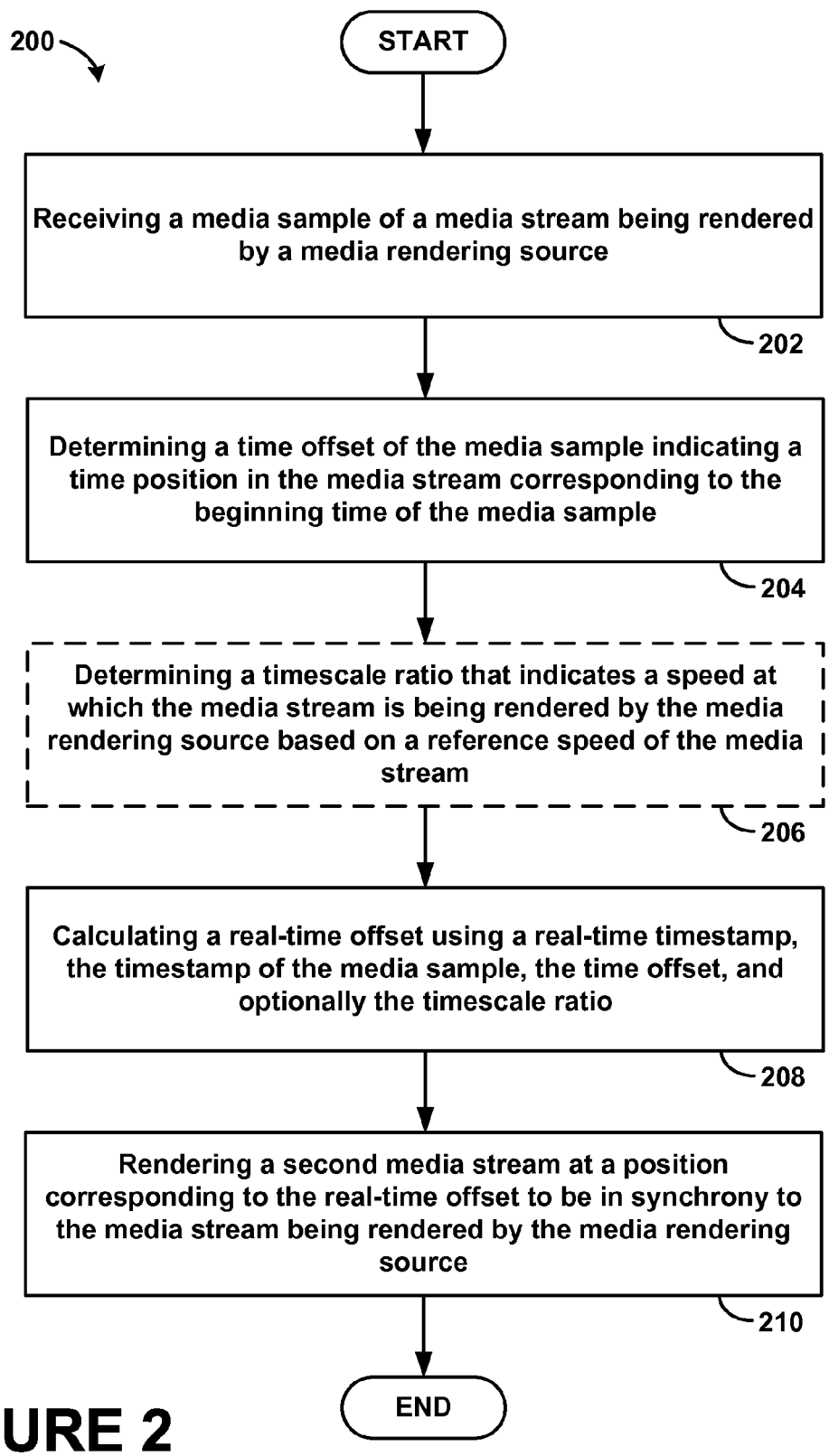
FIG. 2 shows a flowchart of an illustrative embodiment of a method for synchronizing media streams.

FIG. 2 shows a flowchart of an illustrative embodiment of a method 200 for synchronizing media streams. It should be understood that for this and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example.

In addition, each block in FIG. 2 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Initially, at block 202, a client device receives a media sample of a media stream being rendered by a media rendering source. The client device may receive the media sample by recording the media sample as the media stream is being rendered. The media sample is associated with or has a timestamp corresponding to a sampling time of the media sample. For example, the client device may capture a sample of the media stream being rendered, and record a time that the sample is recorded based on a clock on the client device.

A time offset of the media sample can then be determined that indicates a time position in the media stream corresponding to the sampling time of the media sample, as shown at block 204. For example, the client device may send the sample of the media stream to a position identification module that will return an identification of the media sample and the time offset. Alternatively, the client device may determine the time offset.

Optionally, a timescale ratio is then determined that indicates a speed at which the media stream is being rendered by the media rendering source based on a reference speed of the media stream, as shown at block 206. The timescale ratio can be determined by the client device, or by a server and returned to the client device. The timescale ratio is not necessary to synchronize media streams; however, the timescale ratio may be included in some embodiments.

A real-time offset that indicates a present time is then determined using a real-time timestamp, the timestamp of the media sample, the time offset, and optionally the timescale ratio, as shown at block 208. The real-time offset may be calculated using Equation (1) or Equation (4) described above.

The client device can then render a second media stream at a position corresponding to the real-time offset to be in synchrony to the media stream being rendered by the media rendering source, as shown at block 210. The client device may receive the second media stream, or may select the second media stream from memory of the client device (e.g., local storage) or from a database, for example, based on an identity of the media stream being rendered by the media rendering source. The second media stream may be related to the media stream being rendered by the media rendering source, and may be selected based upon a content identification of the media stream. In some examples, the second media stream may be lyrics corresponding to an identified media stream. The second media stream may alternatively be any type of media stream, such as movies, a soundtrack, lyrics, text, video clips, pictures, slideshow, documents, etc.

In one embodiment, the method 200 may be performed to synchronize a display of song lyrics on a first device to a song being played by a second device or media rendering source. A user of the first device may thus view lyrics corresponding to identified ambient music in real-time. The lyrics text may be displayed at a temporal position in synchrony with the ambient music. In one example, the lyrics text may be scrolled across a display on the first device as the song is being played by the second device in a manner so that the lyrics text are displayed at a time when the lyrics are being sung.

In this example, a method and system is provided for triggering an information delivery event to a user. A user listening to any media rendering source, e.g., a commercial radio broadcast of popular music at home, may be interested in singing along with a particular song being broadcast, and thus desires to obtain song lyrics. Using a sampling device, such as a mobile (or cellular) phone, video recorder, camera, a personal digital assistant (PDA) or palm pad, a user captures a sample of the media rendering source and transmits the sample to a service provider, for example. To transmit the sample, the user may dial a predetermined telephone number to access a service, and then hold the telephone handset within audible distance of the source of the audio signal (i.e., the speaker of the user's home stereo) to capture a sample of the environment. In this example, the experiential environment includes the music playing on the user's home stereo. Alternatively, the user may use a sampling device to record a sample of the music being played, and may send the sample to a server.

A system employed by the service provider or the server uses a recognition engine to compare the captured sample to music recordings in a database to identify the song and thereby trigger a desired event for the user. In this example, the triggered event is the delivery of lyric information to the user that corresponds to the song recognized from the captured sample.

Event fulfillment, the delivery of the desired song lyrics to the user, may be accomplished in a number of different ways in both real-time and delayed modes. In real-time mode, lyric data is delivered so that the user can read the lyrics to sing along with the song, in time, as the song is being broadcast. Accordingly, data for the song corresponding to the captured sample is read out of a database and transmitted by the service provider to a user device capable of displaying text.

Depending on the display device and user preference, the real-time delivery of lyrics may be transmitted in a batch arrangement where relatively large portions or the entire lyric data is downloaded at a time, or using a discrete arrangement where lyric data is automatically synchronized to the song and transmitted in pieces to the user as the song progresses. For batch delivery, the user may choose to synchronize the display of the lyrics to the song being played (so that the lyrics are displayed at the appropriate time interval in advance of the lyrics being sung or spoken by the song performer on the broadcast), or in some applications, the user device may be configured to perform synchronization of the batch transmission. The service provider may transmit the lyric data to automatically synchronize to the broadcast song without any action required by the user or user device. Such automatic synchronization is implemented through a derivation of the temporal position of the captured sample within the recognized song, and then lyrics may be transmitted to the user device in pieces as the song progresses, for example.

The delayed mode of event fulfillment includes the delivery of lyrics corresponding to the sampled song sometime after the song broadcast. The same delivery methods as with real-time mode may be used along with delivery methods that are characterized as being more time-consuming such as mail, courier, and facsimile transmission.

In an example embodiment, additional user input may be collected via voice or touch-tone (i.e., DTMF tones) to further control lyric delivery or trigger additional events such as transaction events. For example, by interacting with the user through the capture device or the delivery device, the telephone, and text-displaying device respectively, the service provider may provide purchase options to the user to obtain the record album containing the broadcast and identified song for which the lyrics were sought.

Figure 3A:
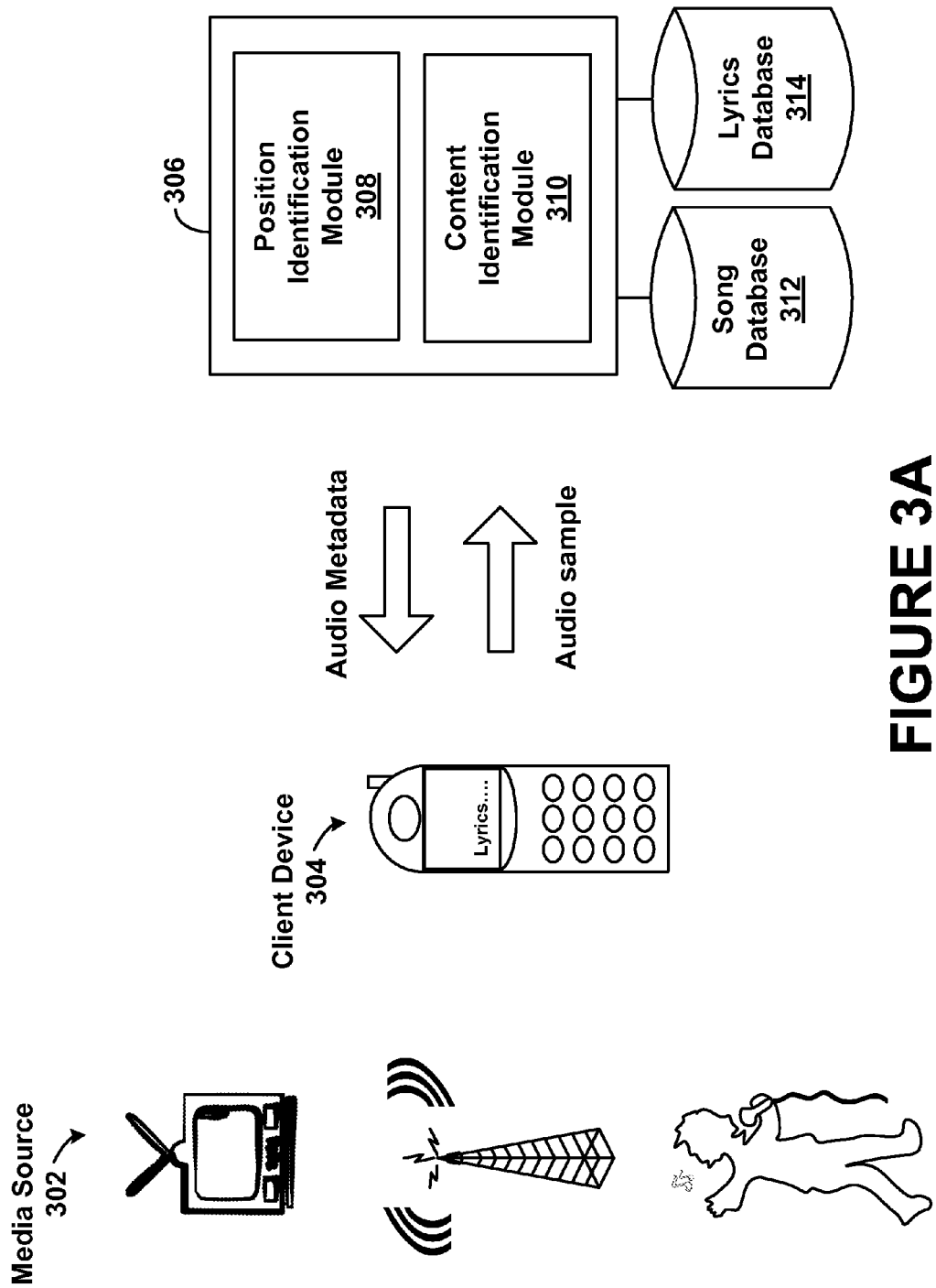
FIGS. 3A-3B illustrate examples of a system for identifying media content or time offsets of media samples, and synchronizing data with the identified media content.
Figure 3B:
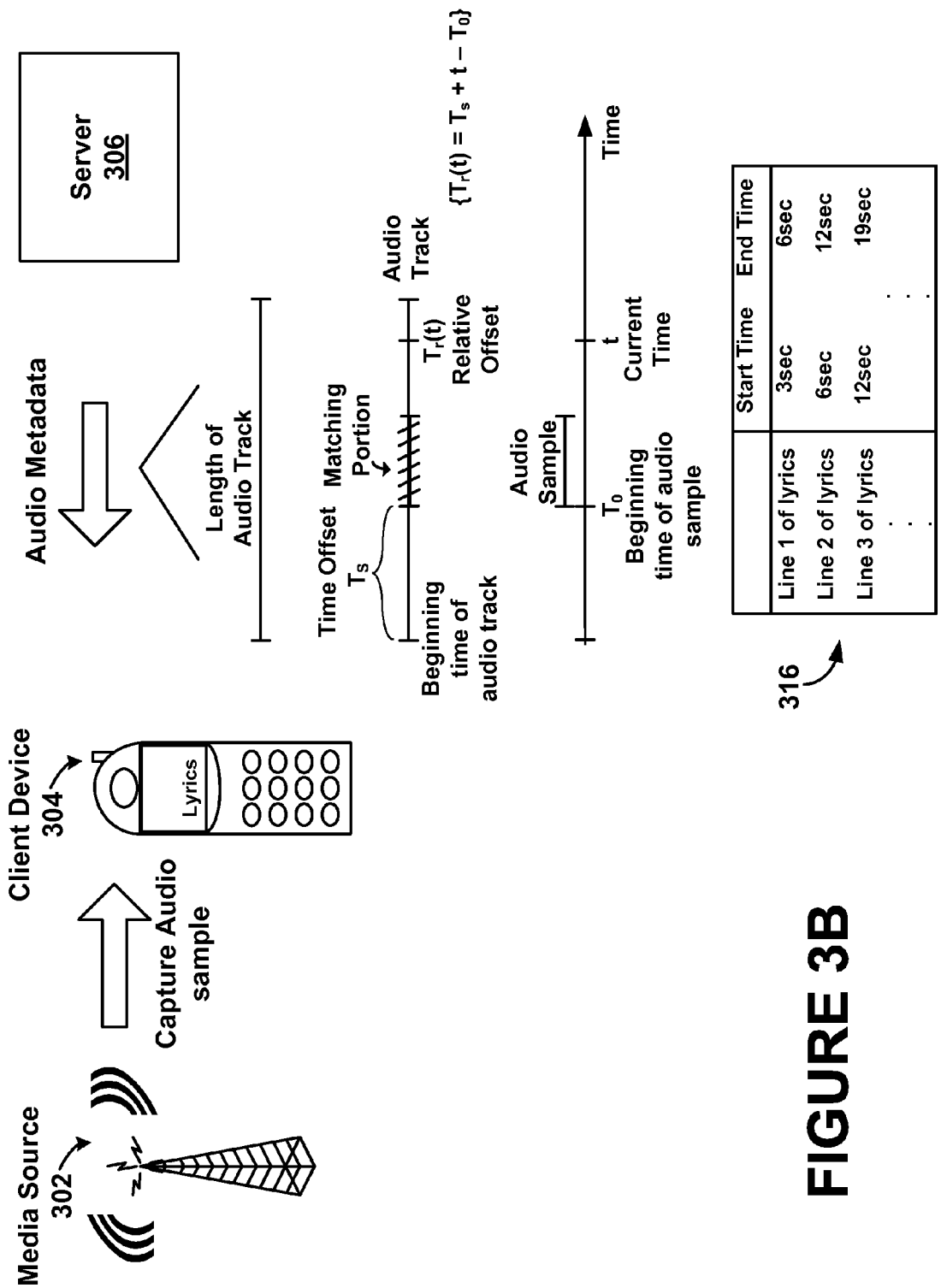

FIGS. 3A-3B illustrate another example of a system for identifying media content, and synchronizing data with the identified media content. In the system of FIG. 3A, the media content may be a song, and the system is operated to capture a sample of the song being rendered by a random media rendering source 302 using a client device 304, and to identify a time offset of the sample and subsequently provide a synchronized display of lyrics of the song on the client device 304.

The media rendering source 302 can be of any form. Examples shown in FIG. 3A include radio and television, pre-recorded audio and video (e.g., tapes, CDs, DVDs, MP3, etc.), media on internet and computer-based systems, live demonstrations or performances. Other examples include telephones, sensory stimuli from ambient surroundings, and other components of elements which may form, alone or in combination, a typical media rendering source.

The client device 304 can be used to capture a sample of a song from the media rendering source 302. The client device 304 may include a microphone or other component to record the sample. The client device 304 may then send the sample to a server 306 via a wireless or wired communication. In the Example shown in FIG. 3A, the client device 304 communicates with the server 306 via a wireless communication network (not shown). The wireless communication network may be any wireless network, such as any of a cellular wireless network, a wireless local area network (WLAN) or Wi-Fi network, a Bluetooth network or other wireless personal area network (WPAN), a wireless metropolitan area network (WMAN), or a wireless wide area network (WWAN), for example.

The server 306 includes a position identification module 308 and a content identification module 310. However, either of the position identification module 308 and/or the content identification module 310 may be separate entities, or alternatively, the position identification module 308 and/or the content identification module 310 may be the same entity or may have functions performed by the same entity.

The server 306 receives the sample from the client device 304 and performs a content identification using any of the methods described herein. The server 306 may access a song database 312 to compare the sample to known samples of songs, to identify the sample, and to retrieve information about the identified sample. The server 306 may then access a lyrics database 314 to retrieve lyrics of the identified song.

The information about the song and a batch file including all lyrics of the song are then sent to the client device 304, as shown in FIG. 3B. A portion of the information may include the estimated identified media stream position $T_S$, which the client device 304 can use to calculate the estimated real-time media stream position $T_r(t)$. The estimated identified media stream position $T_S$ is a time within the length of the identified audio track corresponding to a beginning of the audio sample. The lyrics may be time-annotated lyrics 316 that include information as to media stream time positions per line or word of the lyrics. In one example, the lyrics may be included in an XML file that includes time fields comprising the annotations, or the timing information may be embedded within the lyrics in other ways. The client device 304 can then render lyrics at the time position $T_r(t)$ so that the text of the lyrics are displayed in synchrony (e.g., at the same or about the same time) with the lyrics being rendered by the media rendering source 302.

Alternatively, the server 306 may not send the all lyrics of the song to the client device 304 in a file, but rather, may stream the lyrics to the client device 304 in synchrony with the song being rendered by the media rendering source 302. The lyrics may be sent to the client device 304 moments before the lyrics are rendered by the media rendering source 302 so that the client device 304 has time to receive and display the lyrics synchronously with the lyrics rendered by the media rendering source 302.

FIG. 4 shows a flowchart of an illustrative embodiment of a method 400 for synchronizing lyrics to a song being rendered by a media rendering source. Initially, as shown at block 402, a client device sends an audio sample of a song being rendered by a media rendering source to a position identification module. The audio sample is associated with or has a timestamp ($T_0$) corresponding to a sampling time of the audio sample. The client device will receive from the position identification module a time offset ($T_S$) of the sample indicating a time position in the song corresponding to the sampling time of the audio sample, and optionally a timescale ratio (R) that indicates a speed at which the song is being rendered by the media rendering source based on a reference speed of the song, as shown at block 404. The timescale ratio can optionally be used to correct for differences in a rendering of the song as compared to a reference speed of the song. Thus, the timescale ratio can be used to compensate for time drift in the song.

The client device next calculates a real-time offset using a real-time timestamp that indicates a present time, the timestamp of the audio sample, the time offset, and optionally the timescale ratio, as shown at block 406.

The client device will receive textual lyrics of the song, as shown at block 408. The lyrics may be time-annotated lyrics that include time tags for groups of line, each line, or for words of the lyrics. The time tags may indicate a time position at which the lyrics are sung in the song (e.g., corresponding to an elapsed amount of time). The lyrics may be sent to the client device as a text file, or an XML file, for example. The client device can then render the textual lyrics at a position corresponding to the real-time offset to be in synchrony to the song being rendered by the media rendering source, as shown at block 410. The client device may render the lyrics in a scrolling manner, so that the textual lyrics are displayed at the time that the lyrics are being sung. In addition, the lyrics may be highlighted at times when the words of the lyrics are being sung, a pointer may be used to indicate which lyrics are being sung, or other methods may be used to indicate the words of the lyrics being sung at the time (or at substantially the same time) as the words are being sung, for example. In this regard, the client device may render the lyrics in an animated manner, such that the words of the lyrics are displayed at times when the words are being sung (e.g., in synchrony), or such that all or more words that those currently being sung are displayed but those words being sung are emphasized in an animated manner, for example. Any type of animation may be used to display the lyrics.

The client device may further send additional samples of the song at different or later time periods to the position identification module to receive updates on the time offsets. In this manner, the client device can verify that the lyrics are being displayed in synchrony, for example, over time. The client device may display the lyrics at the updated time offset positions to ensure that the lyrics match the possible changes in the rendering of the song, such as for example, if the musician slows a tempo, or has any interruption in the song.

Using the method 400, a user's device (e.g., cell phone) can record a sample of music being rendered by any type of random media rendering source, and then synchronize lyrics to the song for display on the user's device. The user's device may thus be operated as a live karaoke device, for example.

In another embodiment, the method 200 may be performed to synchronize a display of music information (e.g., guitar tablature or conventional notation or music gaming format) on a first device to a song being played by a second device or media rendering source. A user of the first device may thus view the music information corresponding to identified ambient music in real-time. The music information may be displayed at a temporal position in synchrony with the ambient music. In one example, the music information may be scrolled across a display on the first device as the song is being played by the second device in a manner so that the music information is displayed at a time when the information is being rendered.

FIG. 5 illustrates examples of music information, which may include conventional musical notes 502, guitar tablatures 504, or other musical notations. The music information may be provided to the user's device as time-annotated music files that indicate time sequences for each line. The user's device may then display the musical information in synchrony with the music as the music is being played. This enables a user to play along with the song that the user is listening to in a synchronous manner.

The synchronization of the notation/tablature uses audio recognition to display the notation/tablature in time with the music being rendered by a music source, and provides a way for musicians to be able to play along with music in real time. This is useful for musicians, for example, when learning music many players want to play along with music on the radio or other favorite songs. Synchronized notation/tablatures enable the musician to be guided through music and to be instructed what to play at the point in the song where the notes were heard.

In another example, a musician may play music on an instrument (e.g., guitar, piano, woodwind, midi device or other), and using methods described herein, a song that the musician is playing can be identified. Further, music information (e.g., guitar tablature/conventional notation/music game format) of the song may be returned to a device and displayed on the screen of the musician's device. The music notation may be displayed in synchrony with the song as the song is played by the musician.

This example synchronization method uses audio recognition to identify the music played by the musician, and then syncs the notation/tablature in time with the music. This can help musicians, as when learning music as a lot of players may know a start of a song, but not the remainder of the song. In addition, this enables a player to learn music without having to stop and start playing and to turn pages in music books (as the music will move through the song on the musician's device).

In another embodiment, the methods described herein may be performed to synchronize a display of a movie or music video on a first device to media (e.g., a soundtrack or song) being played by a second device or media rendering source. A user of the first device may thus view a music video corresponding to identified ambient music in real-time. The music video may be displayed at a temporal position in synchrony with the ambient music.

In yet another embodiment, the media stream may be a video stream, and the second media stream may be a soundtrack of the video stream. In addition, or as an alternative, the media stream may be a soundtrack, and the second media stream may be a movie.

In yet another embodiment, the second media stream may be an alternative version of the first media stream, for example a version in different language. Or the second media stream could be at a different resolution than the first media stream, for example, High Definition or 7.1-channel surround sound, such that by synchronizing the second media stream, a higher quality version of the first media stream may be provided.

Figure 6:
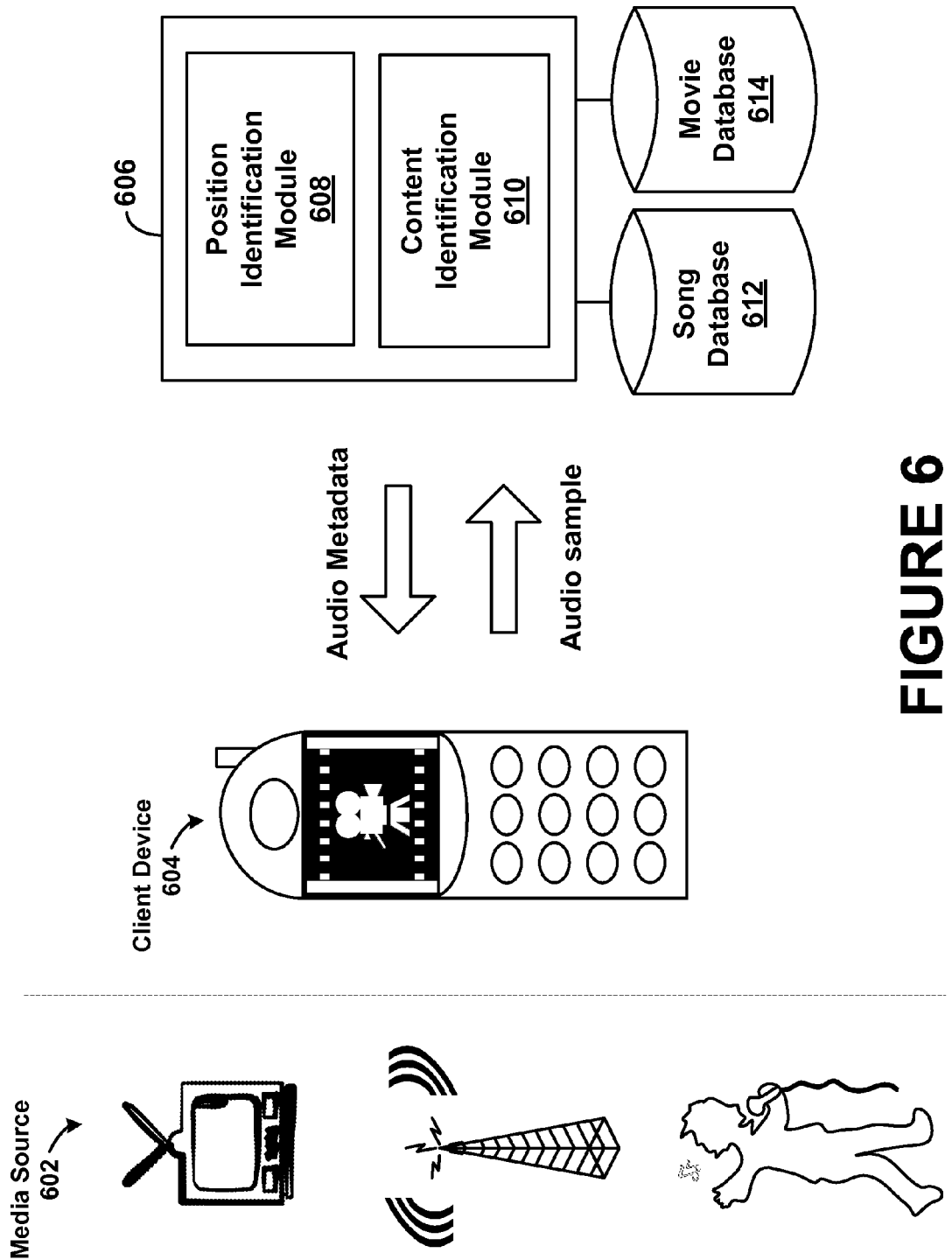
FIG. 6 illustrates another example of a system for identifying media content or time offsets of media samples, and synchronizing data with the identified media content.

FIG. 6 illustrates another example of a system for identifying media content, and synchronizing media with the identified media content. In the system of FIG. 6, the media content may be a song, and the system is operated to capture a sample of the song being rendered by a random media rendering source 602 using a client device 604, and to identify the time offset and optionally to identify the song, and subsequently to provide a synchronized display of a music video of the song on the client device 604.

The client device 604 may capture a sample of the song from the media rendering source 602, and send the sample to a server 606, which includes a position identification module 608 and a content identification module 610 (each of which may be the same or separate entities, for example). The position identification module 608 receives the sample from the client device 604, determines a time offset of the sample. The content identification module 610 may optionally perform a content identification using any of the methods described herein. The content identification module 610 may access a song database 612 to compare the sample to known samples of songs, to identify the sample, and to retrieve information about the identified sample. The content identification module 610 may then access a movie database 614 to retrieve a music video of the identified song.

The position identification module 608 will return an estimated identified media stream position $T_S$ to the client device 604 that can be used to calculate the estimated real-time media stream position $T_r(t)$. The estimated identified media stream position $T_S$ is a time within the length of the identified audio track corresponding to a beginning of the audio sample. The music video may be a time-annotated video that includes information as to media stream time positions per frame or group of frames, for example. The client device 604 can receive the music video from the server 606, and then render the music video at the time position $T_r(t)$ so that the music video is displayed in synchrony (e.g., at the same or about the same time) with the song being rendered by the media rendering source 602.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A method of synchronizing media, comprising:
    a mobile device recording, from an ambient environment of the mobile device, a media sample of a media stream being rendered by a media rendering source, the media sample associated with a timestamp corresponding to a recording time of the media sample;
    determining, based on a content identification of the media sample that results in an identified media track to which the media sample corresponds such that the identified media track is being rendered in the media stream by the media rendering source, a time offset indicating a time position within a length of the identified media track of the media sample corresponding to the recording time of the media sample;
    determining a real-time offset using a real-time timestamp indicative of a present time, the timestamp of the media sample, and the time offset, wherein the real-time offset reflects an elapsed time since the recording time of the media sample; and
    the mobile device rendering a second time-annotated media stream at a position in the time-annotated second media stream corresponding to the real-time offset to be in synchrony to the identified media track in the media stream being independently rendered in the ambient environment of the mobile device by the media rendering source.

2. The method of claim 1, wherein the recording time is a beginning time of the media sample.

3. The method of claim 1, further comprising selecting the second media stream based upon a content identification of the media sample.

4. The method of claim 1, wherein the step of determining a time offset is performed by the mobile device.

5. The method of claim 1, wherein the step of determining a time offset is performed by the mobile device:
    sending the media sample to a position identification module; and
    receiving from the position identification module the time offset.

6. The method of claim 1, wherein determining the real-time offset comprises:

$$T_r(t) = T_S + t - T_0$$

wherein $T_r(t)$ is the real-time offset, $T_S$ is the time offset indicating the time position in the media stream corresponding to the recording time of the media sample, t is the real-time timestamp, and $T_0$ is the timestamp of the media sample.

7. The method of claim 1, further comprising receiving the second media stream from a server.

8. The method of claim 1, further comprising receiving the second media stream from a local storage device of the mobile device.

9. The method of claim 1, wherein the media stream is a soundtrack, and wherein the second media stream is a movie.

10. The method of claim 1, wherein the media stream is a video, and wherein the second media stream is a soundtrack of the video.

11. The method of claim 1, wherein the second media stream is a higher quality version of the media stream.

12. The method of claim 1, wherein the second media stream is an alternative version of the media stream.

13. The method of claim 1, wherein the media stream is a song, and wherein the second media stream is guitar tablatures of the song.

14. The method of claim 1, wherein the media stream is a song, and wherein the second media stream is musical notes of the song.

15. The method of claim 1, wherein the media stream is a song, and wherein the second media stream is a music video of the song.

16. The method of claim 1, wherein the media stream is a song, and wherein the second media stream is textual lyrics of the song.

17. The method of claim 16, further comprising the mobile device animating the textual lyrics on a display in synchrony with the song being rendered by the media rendering source.

18. The method of claim 16, further comprising receiving a file including all lyrics of the song, wherein the lyrics are time-annotated lyrics.

19. The method of claim 16, further comprising receiving streaming lyrics to be synchronously displayed to the song being rendered by the media rendering source.

20. The method of claim 1, further comprising verifying that the rendering of the second media stream is in synchrony to the media stream being rendered by the media rendering source.

21. The method of claim 20, wherein verifying that the rendering of the second media stream is in synchrony to the media stream being rendered by the media rendering source comprises:
the mobile device sending media samples of the media stream at periodic intervals to a discontinuity detection module; and
the mobile device receiving from the discontinuity detection module an instruction to perform a resynchronization of the second media stream with the media stream being rendered by the media rendering sources.

22. The method of claim 20, wherein verifying that the rendering of the second media stream is in synchrony to the media stream being rendered by the media rendering source comprises:
the mobile device sending media samples of the media stream at periodic intervals to a discontinuity detection module; and
the mobile device receiving from the discontinuity detection module an instruction to stop rendering the second media stream.

23. The method of claim 20, wherein verifying that the rendering of the second media stream is in synchrony to the media stream being rendered by the media rendering source comprises:
the mobile device sending media samples of the media stream at periodic intervals to a discontinuity detection module; and
the mobile device receiving from the discontinuity detection module an instruction to perform a content identification of the media stream.

24. A non-transitory computer readable medium having stored therein instructions executable by a computing device to cause the computing device to perform functions of:
recording, from an ambient environment of the computing device, a media sample of a media stream being rendered by a media rendering source, the media sample associated with a timestamp corresponding to a recording time of the media sample;
determining, based on a content identification of the media sample that results in an identified media track to which the media sample corresponds such that the identified media track is being rendered in the media stream by the media rendering source, a time offset indicating a time position within a length of the identified media track of the media sample corresponding to the recording time of the media sample;
determining a real-time offset using a real-time timestamp indicative of a present time, the timestamp of the media sample, and the time offset, wherein the real-time offset reflects an elapsed time since the recording time of the media sample; and
rendering a second time-annotated media stream at a position in the time-annotated second media stream corresponding to the real-time offset to be in synchrony to the identified media track in the media stream being independently rendered in the ambient environment of the client device by the media rendering source.

25. The non-transitory computer readable medium of claim 24, wherein the instructions are executable by the computing device to perform functions of:
sending the media sample to a position identification module; and
receiving from the position identification module the time offset.

26. The non-transitory computer readable medium of claim 24, wherein determining the real-time offset comprises:

$$T_r(t) = T_S + t - T_0$$

wherein $T_r(t)$ is the real-time offset, $T_S$ is the time offset indicating the time position in the media stream corresponding to the recording time of the media sample, t is the real-time timestamp, and $T_0$ is the timestamp of the media sample.

27. The non-transitory computer readable medium of claim 24, wherein the media stream is a song, and wherein the second media stream is textual lyrics of the song.

28. The non-transitory computer readable medium of claim 24, wherein the instructions are executable by the computing device to perform functions of:
verifying that the rendering of the second media stream is in synchrony to the media stream being rendered by the media rendering source.

29. A mobile device comprising:
a media receiver configured to record, from an ambient environment of the mobile device, a media sample of a media stream being rendered by a media rendering source, wherein the media sample is associated with a timestamp corresponding to a recording time of the media sample;

a processor configured to receive, based on a content identification of the media sample that results in an identified media track to which the media sample corresponds such that the identified media track is being rendered in the media stream by the media rendering source, a time offset indicating a time position within a length of the identified media track of the media sample corresponding to the recording time of the media sample;

the processor configured to determine a real-time offset using a real-time timestamp indicative of a present time, the timestamp of the media sample, and the time offset, wherein the real-time offset reflects an elapsed time since the recording time of the media sample; and the mobile device configured to render a second time-annotated media stream at a position in the second time-annotated media stream corresponding to the real-time offset to be in synchrony to the identified media track in the media stream being independently rendered in the ambient environment of the mobile device by the media rendering source.

30. The mobile device of claim 29, wherein the processor is configured to:

send the media sample to a position identification module; and receive from the position identification module the time offset.

31. The mobile device of claim 29, wherein the processor is configured to determine the real-time offset by:

$$T_r(t)=T_S+t-T_0$$

wherein $T_r(t)$ is the real-time offset, $T_S$ is the time offset indicating the time position in the media stream corresponding to the recording time of the media sample, t is the real-time timestamp, and $T_0$ is the timestamp of the media sample.

32. A system comprising:

a server configured to receive a recording, from an ambient environment of a mobile device, of a media sample of a media stream being rendered by a media rendering source, the media sample associated with a timestamp corresponding to a recording time of the media sample, the server configured to determine, based on a content identification of the media sample that results in an identified media track to which the media sample corresponds such that the identified media track is being rendered in the media stream by the media rendering source, a time offset indicating a time position within a length of the identified media track of the media sample corresponding to the recording time of the media sample; and the mobile device configured to receive the time offset from the server and to determine a real-time offset using a real-time timestamp indicative of a present time, the timestamp of the media sample, and the time offset, wherein the real-time offset reflects an elapsed time since the recording time of the media sample, and the mobile device configured to render a second time-annotated media stream at a position in the second time-annotated media stream corresponding to the real-time offset to be in synchrony to the identified media track in the media stream being independently rendered in the ambient environment of the mobile device by the media rendering source.

33. The system of claim 32, wherein the mobile device is configured to:

record the media sample;

send the media sample to the server; and receive from the server the time offset.

34. The system of claim 32, wherein the mobile device is configured to determine the real-time offset by:

$$T_r(t)=T_S+t-T_0$$

wherein $T_r(t)$ is the real-time offset, $T_S$ is the time offset indicating the time position in the media stream corresponding to the recording time of the media sample, t is the real-time timestamp, and $T_0$ is the timestamp of the media sample.

* * * * *